United States Patent
Yoshida et al.

(10) Patent No.: US 7,668,933 B2
(45) Date of Patent: Feb. 23, 2010

(54) INFORMATION PROCESSING APPARATUS AND METHOD AND PROGRAM

(75) Inventors: Mariko Yoshida, Kanagawa (JP); Toshiaki Kusakabe, Tokyo (JP); Satoshi Hiroi, Chiba (JP); Masahiro Hara, Tokyo (JP)

(73) Assignee: Sony Corporation (JP)

( * ) Notice: Subject to any disclaimer, the term of this patent is extended or adjusted under 35 U.S.C. 154(b) by 220 days.

(21) Appl. No.: 11/978,956

(22) Filed: Oct. 30, 2007

(65) Prior Publication Data

US 2008/0208952 A1    Aug. 28, 2008

(30) Foreign Application Priority Data

Dec. 8, 2006    (JP) ............................ P2006-332475

(51) Int. Cl.
G06F 15/16    (2006.01)
(52) U.S. Cl. ..................... 709/217; 709/201; 709/202; 709/203; 709/218; 709/219
(58) Field of Classification Search ......... 709/217–219, 709/201–203
See application file for complete search history.

(56) References Cited

U.S. PATENT DOCUMENTS 7,002,633 B2 *    2/2006    Hayakawa ............... 348/423.1

FOREIGN PATENT DOCUMENTS

| JP | 10-260886 A | 9/1998 |
| JP | 11-161465 A | 6/1999 |
| JP | 11-328073 A | 11/1999 |
| JP | 2003-006555 A | 1/2003 |
| JP | 2006-227925 A | 8/2006 |
| JP | 2006-313502 | 11/2006 |

* cited by examiner

*Primary Examiner*—Vivek Srivastava
*Assistant Examiner*—Thomas Duong
(74) *Attorney, Agent, or Firm*—Lerner, David, Littenberg, Krumholz & Mentlik, LLP

(57) ABSTRACT

Disclosed herein is an information processing apparatus configured to distribute stored content to a client reproducing apparatus connected to the information processing apparatus via a network, which may include acquiring means; real item information generating means; extracting means; virtual item generating means; reproduction sequence list generating means; virtual item information generating means; collecting means; and distributing means.

11 Claims, 12 Drawing Sheets

FIG. 4

ID=001
Filename=/content/a.mpg
Title=Japan Series First Match
Duration=01:00:00
Bitrate=8Mbps
URL=http://xxx/yyy&id=001
...

FIG. 5

ID=010
Title=Japan Series First Match Digest
Duration=00:10:00
Bitrate=8Mbps
URL=http://xxx/yyy&id=010
...
section-info

| REPRODUCTION SEQUENCE | START-TIME | END-TIME | LOCATION |
| --- | --- | --- | --- |
| 1 | 10 | 20 | /content/a.mpg |
| 2 | 30 | 40 | /content/a.mpg |
| 3 | 50 | 60 | /content/a.mpg |

FIG. 9

```
1  <Result>
2    <item>
3      <id>001</id>
4      <title>Japan Series First Match</title>
5      <duration>01:00:00</duration>
6      <res>http://server1/xxxx&id=001</res>
7    </item>
8    <item>
9      <id>010</id>
10     <title>Japan Series First Match Digest</title>
11     <duration>00:10:00</duration>
12     <res>http://server1/xxxx&id=010</res>
13   </item>
14 </Result>
```

INFORMATION PROCESSING APPARATUS AND METHOD AND PROGRAM

CROSS-REFERENCE TO RELATED APPLICATIONS

This application claims priority from Japanese Patent Application No. JP 2006-332475 filed in the Japanese Patent Office on Dec. 8, 2006, the entire content of which is incorporated herein by reference.

BACKGROUND OF THE INVENTION

1. Field of the Invention

The present invention relates to an information processing apparatus and method and a program and, more particularly, to an information processing and method and a program that are configured to allow a reproducing apparatus providing a client to continuously reproduce, with a single operation, one piece of content made up of continuously reproducing in a predetermined sequence a range of portions of a plurality of items of content.

2. Description of the Related Art

A technology is generally gaining popularity in which content is shared for use by use of a network typified by DLNA (Digital Living Network Alliance) and UPnP (Universal Plug and Play), for example.

For example, a technology is proposed in which type of content stored in a server on a network is recognized and, in accordance with the recognized type, a controller presents commands to each user that are selectable for that content by the user, thereby enhancing the ease of operation of that controller (refer to Japanese Patent Laid-Open No. 2006-313502).

However, in the above-mentioned example in which a network is used, it is a premise that a reproducing operation be executed individually on each piece of content, so that, when continuously reproducing, in a predetermined sequence, a range of portions of items of content accumulated in a plurality of servers, processing operations have to be repeated that, in the reproduction of a portion of a first piece of content, access is made to a server in which that first piece of content is stored, search is made for a reproduction start position to start reproducing this content, the reproduction is stopped at a reproduction end position, then, access is made to a server in which a second piece of content is stored to reproduce a portion of this second piece of content, search is made for a reproduction start position to start reproducing this content, the reproduction is stopped at a reproduction end position, and so on. Consequently, it is difficult for the above-mentioned related-art technology to reproduce content without interruption.

SUMMARY OF THE INVENTION

Therefore, the present invention addresses the above-identified and other problems associated with related-art methods and apparatuses and solves the addressed problems by continuously reproducing, in a predetermined sequence, a range of portions set to a plurality of items of content with single command for reproduction by use of a network.

In carrying out the invention and according to one embodiment thereof, there is provided an information processing apparatus configured to distribute stored content to a client reproducing apparatus connected to the information processing apparatus via a network. This information processing apparatus may have acquiring means for acquiring the stored content as a real item; real item information generating means for generating real item information including information about a location at which the real item acquired by the acquiring means is stored and an own location; extracting means for extracting a range that satisfies a predetermined condition from the real item acquired by the acquiring means; virtual item generating means for generating, of the real item extracted by the extracting means, content made up of a plurality of ranges satisfying a predetermined condition as a virtual item; reproduction sequence list generating means for generating a reproduction sequence list indicative of a location of a plurality of real items including a range satisfying the predetermined condition making up the virtual item, a reproduction range indicative of a range satisfying the predetermined condition in each of the plurality of the real items, and a reproduction sequence of a reproduction range in each of the plurality of the real items; virtual item information generating means for generating virtual item information including the reproduction sequence list and information of an own location; collecting means for collecting the real item on the basis of the generated virtual item information; and distributing means for sequentially distributing a reproduction range of the plurality of real items making up the virtual item on the basis of the reproduction sequence list.

In the above-mentioned information processing apparatus, the stored content may be stored in each of a plurality of content accumulation servers connected to the information processing apparatus via the network.

In the above-mentioned information processing apparatus, own locations included in the real item information and the virtual item information may be written in a same format.

In the above-mentioned information processing apparatus, own locations included in the real item information and the virtual item information may be written as URLs.

The above-mentioned information processing apparatus may further have content list generating means for generating a list of the real item information and the virtual item information as a content list of the content, wherein, of the real information and the virtual item information corresponding to the content specified for reproduction in the content list by the client reproducing apparatus, on the basis of information of the own location, the distributing means may access the real item information and the virtual item information corresponding to the content specified for reproduction and, if the content specified for reproduction is a real item, distribute the real item of the content specified for reproduction and, if the content specified for reproduction is a virtual item, sequentially distribute a reproduction range of a plurality of the real items making up the virtual item in the reproduction sequence in accordance with the reproduction sequence list.

In the above-mentioned information processing apparatus, the network may be based on the DLNA standard.

In carrying out the invention and according to another embodiment thereof, there is provided an information processing method configured to operate on an information processing apparatus configured to distribute stored content to a client reproducing apparatus connected to the information processing apparatus via a network. This information processing method may include the steps of acquiring the stored content as a real item; generating real item information including information about a location at which the real item acquired in the acquiring step is stored and an own location; extracting a range that satisfies a predetermined condition from the real item acquired in the acquiring step; generating, of the real item extracted in the extracting step, content made up of a plurality of ranges satisfying a predetermined condition as a virtual item; generating a reproduction sequence list indicative of a location of a plurality of real items including a range satisfying the predetermined condition making up the virtual item, a reproduction range indicative of a range satisfying the predetermined condition in each of the plurality of the real items, and a reproduction sequence of a reproduction range in each of the plurality of the real items; generating virtual item information including the reproduction sequence list and information of an own location; collecting the real item on the basis of the generated virtual item information; and sequentially distributing a reproduction range of the plurality of real items making up the virtual item on the basis of the reproduction sequence list.

In carrying out the invention and according to still another embodiment thereof, there is provided a program configured which may make a computer for controlling an information processing apparatus configured to distribute stored content to a client reproducing apparatus connected to the information processing apparatus via a network execute the steps of acquiring the stored content as a real item; generating real item information including information about a location at which the real item acquired in the acquiring step is stored and an own location; extracting a range that satisfies a predetermined condition from the real item acquired in the acquiring step; generating, of the real item extracted in the extracting step, content made up of a plurality of ranges satisfying a predetermined condition as a virtual item; generating a reproduction sequence list indicative of a location of a plurality of real items including a range satisfying the predetermined condition making up the virtual item, a reproduction range indicative of a range satisfying the predetermined condition in each of the plurality of the real items, and a reproduction sequence of a reproduction range in each of the plurality of the real items; generating virtual item information including the reproduction sequence list and information of an own location; collecting the real item on the basis of the generated virtual item information; and sequentially distributing a reproduction range of the plurality of real items making up the virtual item on the basis of the reproduction sequence list.

In carrying out the invention and according to yet another embodiment thereof, there is provided a program storage media configured to store the above-mentioned program.

The information processing apparatus according to an embodiment of the present invention may be either stand-alone unit or an information processing block in a unit.

As described and according to the invention, a range of some of a plurality of pieces of stored content may be continuously reproduced in a predetermined sequence with a single command for reproduction.

BRIEF DESCRIPTION OF THE DRAWINGS

Other objects and aspects of the invention will become apparent from the following description of embodiments with reference to the accompanying drawings in which:

FIG. 4 is a diagram illustrating real item information;

FIG. 5 is a diagram illustrating virtual item information;

FIG. 9 is a diagram illustrating an example of item information to be distributed by item information distribution processing;

DETAILED DESCRIPTION

Figure 1:
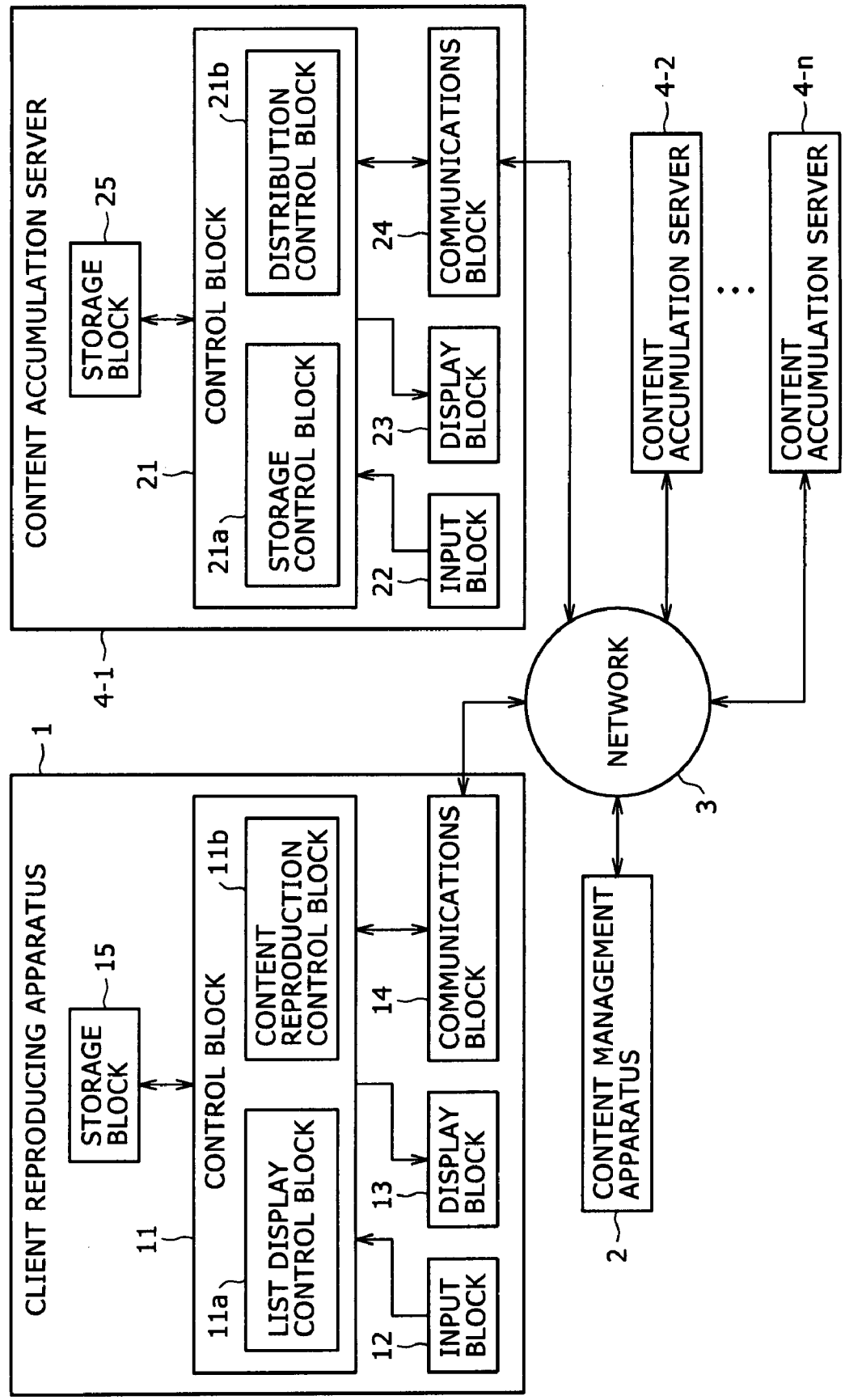
FIG. 1 is a block diagram illustrating an exemplary configuration of a content management system practiced as one embodiment of the invention.

This invention will be described in further detail by way of embodiments thereof with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Further, the description hereof does not denote the entire invention described herein. In other words, the existence of any invention described herein and not claimed herein will not deny the existence of any inventions that may be filed as a divisional application, emerge as a result of amendment, or added hereto in the future.

To be more specific, the information processing apparatus practiced as one embodiment of the invention is an information processing apparatus (a content management apparatus 2 shown in FIG. 2, for example) configured to distribute stored content to a client reproducing apparatus connected to the information processing apparatus via a network. This information processing apparatus has acquiring means (a item information acquisition block 85 shown in FIG. 2, for example) for acquiring the stored content as a real item; real item information generating means (a real item processing block 82 shown in FIG. 2, for example) for generating real item information including information about a location at which the real item acquired by the acquiring means is stored and an own location; extracting means for extracting a range that satisfies a predetermined condition from the real item acquired by the acquiring means; virtual item generating means (a virtual item processing block 84 shown in FIG. 2, for example) for generating, of the real item extracted by the extracting means, content made up of a plurality of ranges satisfying a predetermined condition as a virtual item; reproduction sequence list generating means (a reproduction sequence list generating block 93 shown in FIG. 2, for example) for generating a reproduction sequence list indicative of a location of a plurality of real items including a range satisfying the predetermined condition making up the virtual item, a reproduction range indicative of a range satisfying the predetermined condition in each of the plurality of the real items, and a reproduction sequence of a reproduction range in each of the plurality of the real items; virtual item information generating means (a virtual item information generating block 94 shown in FIG. 2, for example) for generating virtual item information including the reproduction sequence list and information of an own location; collecting means (a real item collection block 126 shown in FIG. 2, for example) for collecting the real item on the basis of the generated virtual item information; and distributing means (an item binary stream output block 129 shown in FIG. 2, for example) for sequentially distributing a reproduction range of the plurality of real items making up the virtual item on the basis of the reproduction sequence list.

The stored content may be stored in each of a plurality of content accumulation servers (content accumulation servers 4 shown in FIG. 1) connected to the information processing apparatus via the network.

Figure 2:
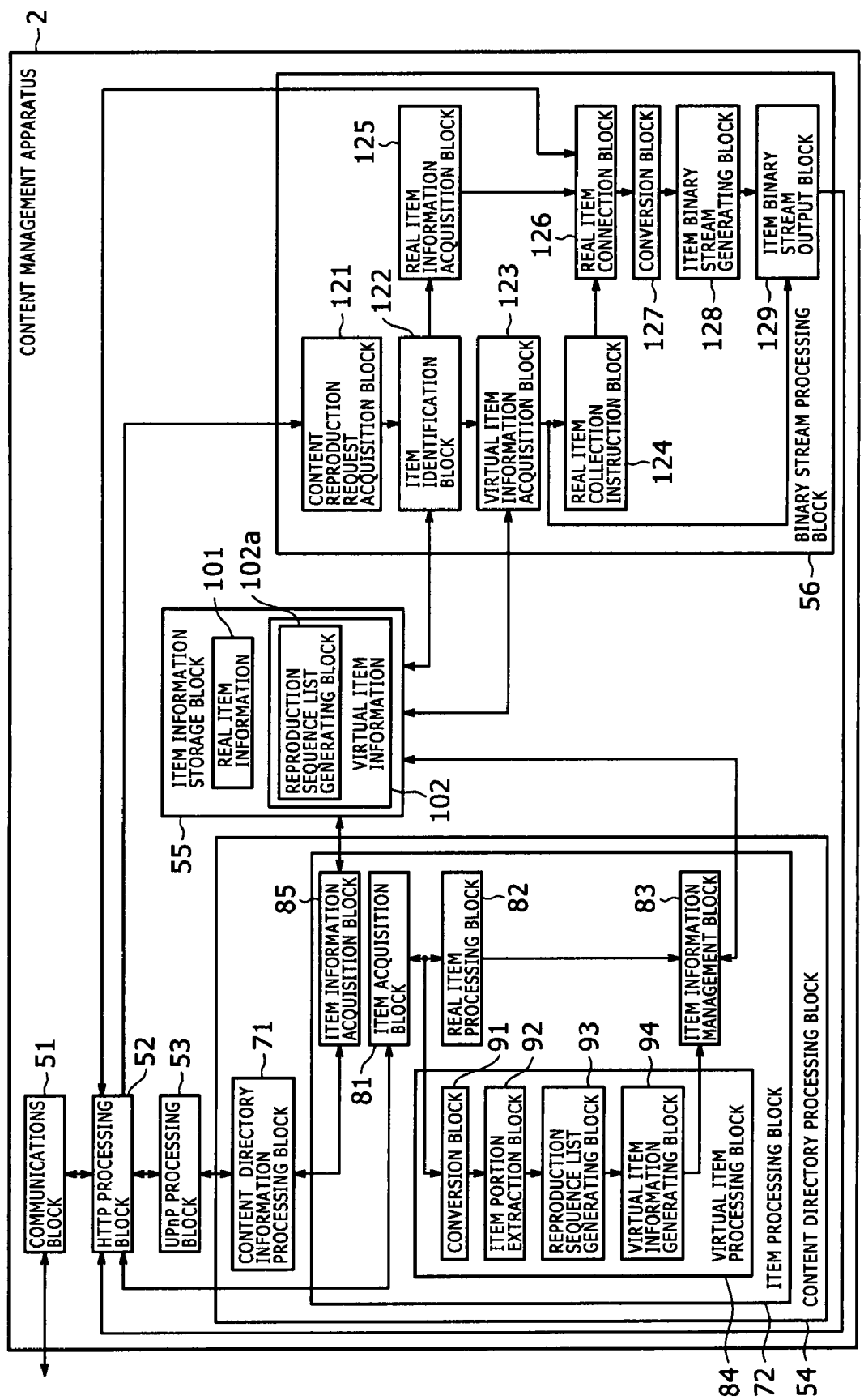
FIG. 2 is a block diagram illustrating an exemplary configuration of a content management apparatus shown in FIG. 1.

The above-mentioned information processing apparatus may further have content list generating means (a content directory information processing block 71 shown in FIG. 2, for example) for generating a list of the real item information and the virtual item information as a content list of the content, wherein, of the real information and the virtual item information corresponding to the content specified for reproduction in the content list by the client reproducing apparatus, on the basis of information of the own location, the distributing means may access the real item information and the virtual item information corresponding to the content specified for reproduction and, if the content specified for reproduction is a real item, distribute the real item of the content specified for reproduction and, if the content specified for reproduction is a virtual item, sequentially distribute a reproduction range of a plurality of the real items making up the virtual item in the reproduction sequence in accordance with the reproduction sequence list.

The information processing method practiced as another embodiment of the invention is a method that is configured to operate on an information processing apparatus configured to distribute stored content to a client reproducing apparatus connected to the information processing apparatus via a network. This information processing method has the steps of acquiring (step S3 shown in FIG. 3, for example) the stored content as a real item; generating (step S5 shown in FIG. 3, for example) real item information including information about a location at which the real item acquired in the acquiring step is stored and an own location; extracting (step S8 shown in FIG. 3, for example) a range that satisfies a predetermined condition from the real item acquired in the acquiring step; generating (steps S7 through S10 shown in FIG. 3, for example), of the real item extracted in the extracting step, content made up of a plurality of ranges satisfying a predetermined condition as a virtual item; generating (step S9 shown in FIG. 3, for example) a reproduction sequence list indicative of a location of a plurality of real items including a range satisfying the predetermined condition making up the virtual item, a reproduction range indicative of a range satisfying the predetermined condition in each of the plurality of the real items, and a reproduction sequence of a reproduction range in each of the plurality of the real items; generating (step S11 shown in FIG. 3, for example) virtual item information including the reproduction sequence list and information of an own location; collecting (steps S136 and S144 shown in FIG. 11, for example) the real item on the basis of the generated virtual item information; and sequentially distributing (steps S139 and S147 shown in FIG. 11, for example) a reproduction range of the plurality of real items making up the virtual item on the basis of the reproduction sequence list.

Now, referring to FIG. 1, there is shown an exemplary configuration of a content management system practiced as one embodiment of the invention.

A client reproducing apparatus 1 requests, via a network 2 specified by DLNA (Digital Living Network Alliance) for example, a content management apparatus 2 for the reproduction of predetermined content. In response, the content management apparatus 2 distributes the specified content collected from content accumulation servers 4-1 through 4-n in which the specified content is stored. Then, the client reproducing apparatus 1 receives and reproduces this content. It should be noted that the content accumulation servers 4-1 through 4-n will be generically referred to simply as a content accumulation server 4 unless it is necessary to make distinction between these servers. This holds the same with other configurations.

The content management apparatus 2 reads content accumulated in the content accumulation servers 4-1 through 4-n and accumulates the read content as item information. The content is classified into a real item made up of original content and a virtual item formed by reproducing a portion of original content in a predetermined sequence of reproduction. The item information of the content corresponding to a real item is real item information. The item information of the content corresponding to a virtual item is virtual item information. The content management apparatus 2 distributes a list of accumulated real item information and virtual item information to the client reproducing apparatus 1 as a content list.

Upon receiving the above-mentioned content list, the client reproducing apparatus 1 displays the received content list, thereby requesting the content management apparatus 2 for the reproduction of a desired piece of content selected from the content list. If requested by the client reproducing apparatus 1 for the reproduction of content and the content requested for reproduction is a real item, the content management apparatus 2 reads the content corresponding to the real item from the content accumulation server 4 in which the real item is stored and distributes the read content. On the other hand, if the content specified for reproduction is a virtual item, the content management apparatus 2 accesses the content accumulation server 4 in which a plurality of real items making up the real item are stored on the basis of the virtual item information, reads a portion of the content corresponding to the real item, sequentially reproduces the read portion, and distributes the reproduced portion to the client reproducing apparatus 1.

The client reproducing apparatus 1 is a personal computer in which content reproducing software is installed, for example, and has a control block 11 made up of a CPU (Central Processing Unit), a RAM (Random Access Memory), and a ROM (Read Only Memory), an input block 12 made up of a keyboard and a mouse, a display block 13 made up of a CRT (Cathode Ray Tube) or an LCD (Liquid Crystal Display), a communications block 14 made up of a communications interface for executing communication based on a wireless LAN (Local Area Network) compliant with IEEE (Institute of Electrical and Electronics Engineers) 802, and a storage block 15 made up of a hard disk drive or a semiconductor memory, for example.

The control block 11 has a list display control block 11a and a content reproduction control block 11b. The list display control block 11a controls the communications block 14 to request the content management apparatus 2 for a content list and displays a requested content list distributed from the content management apparatus 2 onto the display block 13. The content reproduction control block 11b controls the communications block 14 to transmit to the content management apparatus 2 the information instructing the reproduction of content specified for reproduction through the input block 12. On the basis of the instruction for the reproduction of content, the content reproduction control block 11b reproduces the content distributed from the content management apparatus 2 and displays the reproduced content on the display block 13.

The content accumulation server 4 is a personal computer in which software containing sound and video recording capabilities is installed and has a control block 21 made up of a CPU, a RAM, and a ROM, an input block 22 made up of a keyboard and a mouse, a display block 23 made up of a CRT (Cathode Ray Tube) or an LCD (Liquid Crystal Display), a communications block 24 made up of a communications interface for executing communication based on a wireless LAN compliant with IEEE 802, and a storage block 25 made up of a hard disk drive or a semiconductor memory, for example.

The 21 has a storage control block 21a and a distribution control block 21b. On the basis of a request from the content management apparatus 2, the storage control block 21a controls the communications block 24 to supply all content stored in the storage block 25. Also, if new content is stored in the storage block 25, the storage control block 21a controls the communications block 24 to supply the newly registered content to the content management apparatus 2, thereby prompting the content management apparatus 2 for the registration as item information. The distribution control block 21b controls communications block 24 to supply requisite content to the content management apparatus 2 when the content is reproduced by the content management apparatus 2 on the basis of a content reproduction request from the client reproducing apparatus 1.

It should be noted that the term "content" as used herein denotes AV (Audio Visual) data, moving-image files, music files, and still-image files, for example. The term "item" as used herein denotes a minimum unit of content; namely, one track of music data recorded in each CD, for example. Of items, a real item corresponds to each piece of content, one to one; a virtual item denotes a piece of content that is newly generated by continuously reproducing a given range of two or more real items in a predetermined sequence. Therefore, a virtual item is an item that is newly generated from a predetermined range of two or more real items; therefore unlike the real item, the virtual item is immaterial in content that is realized by continuously reproducing a given range of two or more real items in a predetermined sequence as described above.

The following describes a configuration of the content management apparatus 2 practiced as one embodiment of the invention with reference to FIG. 2.

A communications block 51 is a communications interface configured to execute communication over the network 3 through a wireless LAN based on the IEEE 802 standard. A HTTP (Hyper Text Transfer Protocol) processing block 52 is configured to execute the communication of various data based on HTTP.

A UPnP (Universal Plug and Play) processing block 53 converts a command received from the HTTP processing block 52 into a command compliant with the UPnP standard or guideline to supply the converted command to a content directory processing block 54 and, at the same time, supplies a command compliant with the UPnP standard or guideline supplied from the content directory processing block 54 to the HTTP processing block 52.

The content directory processing block 54 generates item information on the basis of the content accumulated in the content accumulation server 4 and stores the generated item information to an item information storage block 55 and, at the same time, generates a content directory on the basis of the item information stored in the item information storage block 55 to transmit the generated content directory to the content management apparatus 2 via the UPnP processing block 53, the content directory processing block 54, and the communications block 51.

A binary stream processing block 56 reads the real item of the content specified for reproduction by the client reproducing apparatus 1 from the content accumulation server 4 on the basis of the item information of the item information storage block 55 and distributes the read real item to the client reproducing apparatus 1 via the HTTP processing block 52 and the communications block 51 as binary stream data.

An item processing block 72 of the content directory processing block 54 generates item information and stores the generated item information into the item information storage block 55 and, at the same time, reads the item information from the item information storage block 55 to supply the read item information to a content directory information processing block 71. The content directory information processing block 71 generates content directory from the item information supplied from the item processing block 72 and distributes the generated content directory information to the client reproducing apparatus 1.

An item acquisition block 81 of the item processing block 72 gets the content from the content accumulation server 4 as items and supplies the content to a real item processing block 82 and a virtual item processing block 84.

The real item processing block 82 outputs the ID, title, and duration of each item making up a real time supplied from the item acquisition block 81 and the location (information indicative which content accumulation server 4 this real item is stored) of the real time to an item information management block 83 as real item information.

The virtual item processing block 84 generates a virtual item from the real item supplied from the item acquisition block 81 and outputs the ID, title, and duration of the content of each real item making up the generated virtual item and the location, reproduction position, and a reproduction sequence list of each real time making up the virtual item to the item information management block 83 as virtual item information.

The item information management block 83 stores the real item information supplied from the real item processing block 82 and the virtual item information supplied from the virtual item processing block 84 into the item information storage block 55 as real item information 101 and a virtual item information 102. It should be noted that the virtual item information 102 contains a reproduction sequence list 102a. Referring to FIG. 2, the item information storage block 55 lists one piece of real item information 101 and one piece of virtual item information 102; actually, however, there are stored a plurality of pieces of real item information 101 and virtual item information 102.

An item information acquisition block 85 extracts item information made up of the real item information 101 and the virtual item information 102 stored in the item information storage block 55 and supplies the extracted item information to the content directory information processing block 71.

A conversion block 91 of the virtual item processing block 84 recognizes the codec of a real item and converts the recognized coded into a reproducible codec by an item portion extraction block 92, supplying the obtained codec to the item portion extraction block 92.

The item portion extraction block 92 reproduces a real item to extract a range that satisfies a predetermined condition.

Here, the item portion extraction block 92 sequentially extracts reproduction ranges higher in volume than a predetermined level among the real items to be reproduced and supplies the reproduction start time and reproduction end time of each extracted reproduction range to a reproduction sequence list generating block 93.

The reproduction sequence list generating block 93 generates a reproduction sequence list on the basis of the information about the extracted items supplied from the item portion extraction block 92 and supplies the generated reproduction sequence list to a virtual item information generating block 94.

The virtual item information generating block 94 generates a virtual item information on the basis of the reproduction sequence list supplied from the reproduction sequence list generating block 93 and supplies the generated virtual item information to the item information management block 83.

A content reproduction request acquisition block 121 of the binary stream processing block 56 gets a content reproduction request supplied from the client reproducing apparatus 1 along with an ID for specifying content and supplies these request and ID to an item identification block 122.

The item identification block 122 accesses the item information storage block 55 on the basis of the information of the content-specifying ID included in the content reproduction request received from the content reproduction request acquisition block 121 to determine whether the content requested for reproduction is a real item or a virtual item. If the content requested for reproduction is found to be a real item, the item identification block 122 notifies a real item information acquisition block 125 thereof; if the content requested for reproduction is found to be a virtual item, the item identification block 122 notifies a virtual item information acquisition block 123 thereof.

Notified by the item identification block 122 of the instruction of reproduction of the content made up of virtual items, the virtual item information acquisition block 123 accesses the item information storage block 55 to read the virtual item information corresponding to the content requested for reproduction and supplies the read virtual item information to a real item acquisition instruction block 124 and an item binary stream output block 129.

The real item acquisition instruction block 124 instructs a real item collection block 126 to collect the real items necessary for the reproduction of the contents made up of virtual items on the basis of the virtual item information received from the virtual item information acquisition block 123.

Notified by the item identification block 122 of the instruction of the reproduction of the content made up of real items, the real item collection instruction block 125 instructs the real item collection block 126 to collect the real items necessary for the reproduction of the content instructed for reproduction.

In accordance with the instruction received from the real item acquisition instruction block 124 or the real item information acquisition block 125, the real item collection block 126 accesses the content accumulation server 4 to collect the necessary real items and supplies the connected real items to a conversion block 127.

The conversion block 127 converts the received real items into a predetermined codec that is reproducible by an item binary stream generating block 128. It should be noted that if the read real items have already been converted in a predetermined codec, the conversion block 127 directly supplies the real items to the item binary stream generating block 128.

The item binary stream generating block 128 generates a binary stream from the real items converted into a predetermined codec and supplies the generated binary stream to the item binary stream output block 129.

If the binary stream to be distributed is a virtual item, the item binary stream output block 129 sequentially distributes the content ranging from a predetermined start position to a predetermined end position to the client reproducing apparatus 1 in the sequence of a predetermined item binary stream in accordance with the reproduction sequence list information included in the virtual item information received from the virtual item information acquisition block 123. If the binary stream to be distributed is a real item, the item binary stream output block 129 directly distributes the content ranging from a predetermined reproduction start position to a predetermined end position to the client reproducing apparatus 1.

Figure 3:
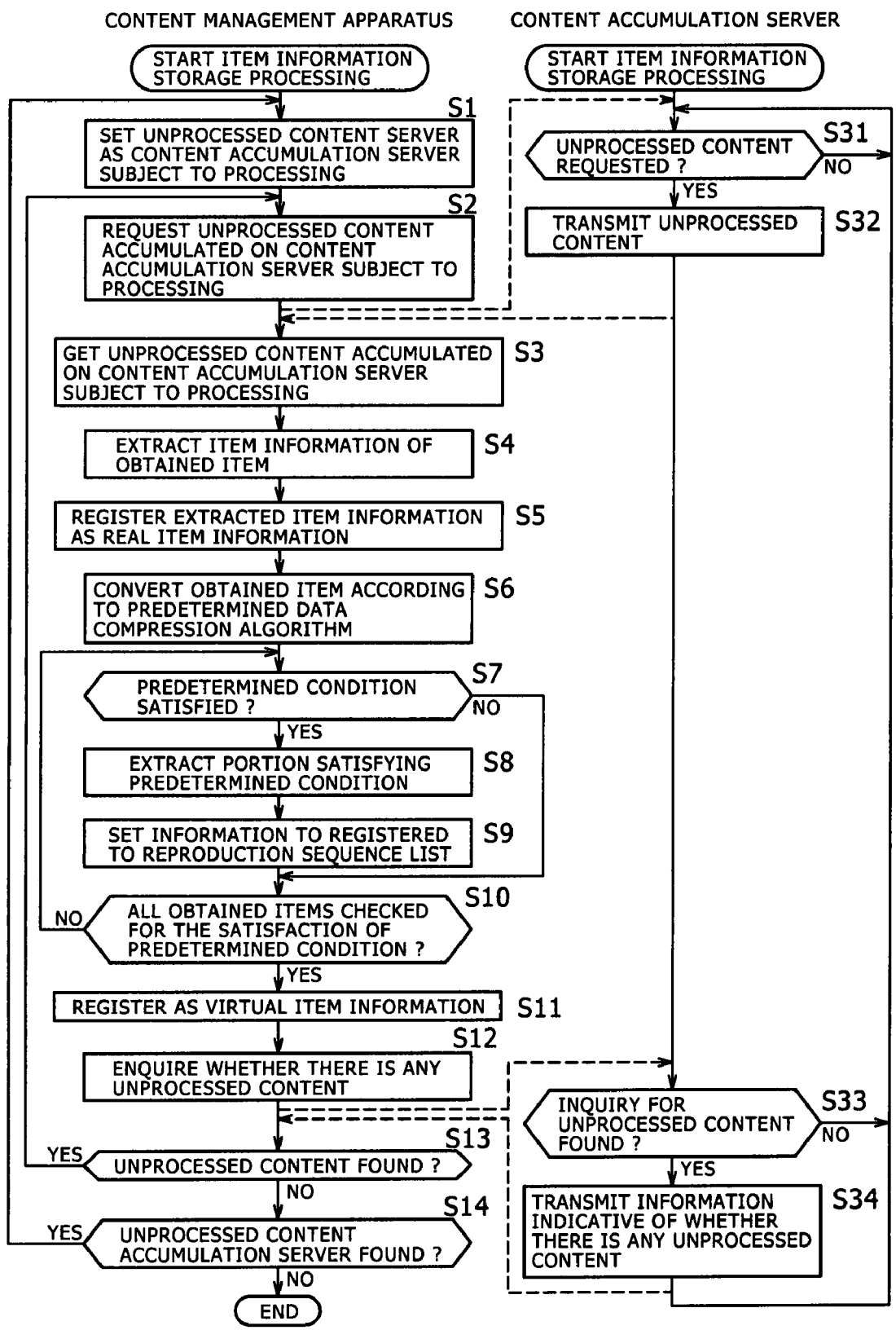
FIG. 3 is a flowchart indicative of item information storage processing shown in FIG. 1.

The following describes item information storage processing with reference to the flowchart shown in FIG. 3. This item information storage processing is first executed when the content management apparatus 2 is connected to the network 3 to start operating.

In step S1, the item acquisition block 81 of the content management apparatus 2 controls the HTTP processing block 52 to recognize the content accumulation servers 4-1 through 4-*n* via the communications block 51 and the network 3 on the basis of HTTP protocol, thereby setting any of these servers that has not been processed as the content accumulation server 4 subject to processing.

In step S2, the item acquisition block 81 requests the content accumulation server 4 subject to processing for the supply of unprocessed content.

In step S31, the storage control block 21*a* of the control block 21 in the content accumulation server 4 controls the communications block 24 to determine whether unprocessed content has been requested from the content management apparatus 2 and repeats this processing until unprocessed content is requested. If, in step S31, unprocessed content is found requested by the process of step S2, then the storage control block 21*a* reads in step S32 the unprocessed content from among the content stored in the storage block 25 and controls the communications block 24 to transmit the read unprocessed content to the content management apparatus 2.

In step S3, the item acquisition block 81 gets the unprocessed content as an item via the network 3, the communications block 51, and the HTTP processing block 52 and supplies the obtained item to the real item processing block 82 and the virtual item processing block 84.

In step S4, the real item processing block 82 extracts item information from the unprocessed item received from the item acquisition block 81. To be more specific, the real item processing block 82 extracts the item information, the file name, title, duration, and bit rate, of the supplied item and supplies the extracted item information to the item information management block 83. It should be noted that the file name includes all the paths indicative of the location and the location information for identifying the content accumulation server 4 in which a file making up that item is stored and the directory of that content accumulation server 4.

In step S5, the item information management block 83 attaches an ID and a URL indicative of the location of the item information itself to the supplied item information and stores the resultant item information into the item information storage block 55 a real item information 101 as shown in FIG. 4.

In FIG. 4, ID, file name, title, duration, bit rate, and URL are written from to down, which the ID is "ID=001," file name is "Filename=/content/a.mpg," the title is "Title=Japan Series First Match," the duration is "Duration=01:00:00," the bit rate is "Bitrate=8 Mpbs," and the URL is "URL=http://xxx.yyy&id=001." Therefore, in the case of the real item information of the real item with ID being "001," it indicates that this real item information is a file existing at a position indicated by "/content/a.mpg," title is "Japan Series First Match," duration is one hour, bit rate is "8 Mbps," URL indicative of the location of this real item information is "http://xxx.yyy&id=001."

In step S6, the conversion block 91 of the virtual item processing block 84 converts the item received from the item acquisition block 81 into a data format reproducible in the item portion extraction block 92 in accordance with a data compression algorithm for this item and supplies the converted item to the item portion extraction block 92. It should be noted that, depending on the item compression algorithm used, the data format conversion need not always be made; in such a case, the conversion block 91 directly supplies the received item to the item portion extraction block 92.

In step S7, the item portion extraction block 92 sequentially reproduces the real items having a predetermined data format received from the conversion block 91 to determine whether scenes satisfy a predetermined condition. Namely, here, the predetermined condition is the reproduction of sound equal to or higher in volume than a predetermined level, so that the item portion extraction block 92 determines whether each item to be reproduced is a scene equal to or higher in volume than a predetermined level. If the real item is found to be a portion satisfying this predetermined condition in step S7, then the item portion extraction block 92 extracts a condition-satisfying range in that real time and supplies the extracted range to the reproduction sequence list generating block 93.

In step S9, the reproduction sequence list generating block 93 sets the information to be registered to the reproduction sequence list on the basis of the information of the supplied range satisfying the predetermined condition and supplies the resultant range to the virtual item information generating block 94.

On the other hand, if the portion is found not satisfying the predetermined condition, for example, in step S7, then steps S8 and S9 are skipped.

In step S10, the item portion extraction block 92 determines whether determination has been made whether the range satisfies the predetermined condition in all the reproduction ranges of the supplied real item. If the determination is found not made in all the reproduction ranges, then the procedure returns to step S7. Namely, the processes of steps S7 through S10 are repeated until a real item is reproduced and the scene is found satisfying a predetermined condition in all reproduction ranges.

If the determination is found that the scene satisfies a predetermined condition in all reproduction ranges of the real time, then the virtual item information generating block 94 generates virtual item information in step S11 on the basis of the information to be registered into the supplied reproduction sequence list, supplying the generated virtual item information to the item information management block 83. On the basis of this item information, the item information management block 83 stores the virtual item information into the item information storage block 55 as virtual item information 102 as shown in FIG. 5 for example.

In FIG. 5, ID, title, duration, bit rate, URL, and section information are recorded from up to down. In this example, ID is "ID=010," title is "Title=Japan Series First Match Digest," duration is "Duration=00:10:00," bit rate is "Bitrate=8 Mbps," URL is "URL=http://xxx.yyy&id=010," and section information indicative of reproduction sequence list 102a is "section-info," followed by reproduction sequence list 102a.

Therefore, in FIG. 5, in the case of the virtual item information of a virtual item with the ID being "010," the title is "Japan Series First Match Digest" the duration is 10 minutes, the bit rate is "8 Mbps," and the location of this virtual item information is URL "http://xxx.yyy&id=010."

Further, in FIG. 5, below "section-info," the reproduction sequence list 102a is shown in reproduction sequence, reproduction start position (Start-Time), reproduction end position (End-Time), and the location of that item (Location) from left to right for the supplied range satisfying a predetermined condition. In the case shown in FIG. 5, "1," "10," "20" and "/content/a.mpg" are recorded from left at top, "2," "30," "40" and "/content/a.mpg" are recorded from left on the second raw, "3," "50," "60" and "/content/a.mpg" from left on the bottom. Therefore, according to the reproduction sequence list 102a shown in FIG. 5, the virtual item of "ID=010" is realized by first reproducing a range of 10 to 20 seconds of the items of file indicated by "/content/a.mpg," secondly reproducing a range of 30 to 40 seconds of the items of file indicated by "/content/a.mpg," and lastly reproducing a range of 50 to 60 seconds of the items of file indicated by "/content/a.mpg."

In step S12, the item acquisition block 81 enquires the content accumulation server 4 for unprocessed content via the HTTP processing block 52, the communications block 51, and the network 3.

In step S33, the storage control block 21a of the content accumulation server 4 controls the communications block 24 to determines whether there has been any enquiry for unprocessed content and repeats this processing until there is an enquiry for unprocessed content. If an enquiry for unprocessed content as a result of the process of step S12 is found in step S33, then the storage control block 21a access the storage block 25 in step S34 to determine whether there is any unprocessed content and transmits the decision to the content management apparatus 2 through the communications block 24.

In step S13, the item acquisition block 81 determines whether there is any unprocessed content on the basis of the decision as a result of the process of step S34 received from the content accumulation server 4 that is subject to processing. If unprocessed content is found in step S13, then the procedure returns to step S2. Namely, the processes of steps S2 through S13 are repeated until the real item information and the virtual item information have been registered for all pieces of content stored in the content accumulation server 4 subject to processing.

On the other hand, if no unprocessed content is found in step S13, then the item acquisition block 81 determines in step S14 whether there are any unprocessed servers 4 on the network 3. If any unprocessed servers 4 are found, then the procedure returns to step S1. Namely, the processes of steps S1 through S14 are repeated until the real item information and the virtual item information have been stored in the item information storage block 55 for all the content accumulation servers 4. When no more unprocessed server 4 is found, the processing comes to an end.

The above-mentioned sequence of processing stores in the item information storage block 55 the real item information and the virtual item information for all pieces of content stored in the content accumulation server 4 connected to the network 3. Hence, the content management apparatus 2 can hold the real item information and the virtual item information for all pieces of content stored in the content accumulation server 4 connected to the network 3.

Further, virtual item information provides item information of a new piece of content with at least one or more reproduction ranges extracted that are higher in volume than a predetermined level of the reproduction ranges of the real item, so that, is content is a sport program for example, only a scene in which the volume gets higher than a predetermined level, such as when cheers are erupted from spectators, is extracted to be continuously reproduced. Therefore, the virtual item information can be newly generated for reproducing such new content as a digest version of the original content.

It should be noted that, in the example described above, one virtual item is generated for one real item; it is also practicable two type of predetermined volume threshold values are set in the item portion extraction block 92 to generate the virtual item information corresponding to the two conditions. In this case, when two volume threshold values are set, if the volume of one threshold value is high, the range to be extracted is relatively narrow, so that virtual item information corresponding to the content of digest version having a relatively short duration as a whole is generated; if the volume of the other threshold value is low, the range of the extracted is relatively wide, so that the virtual item information corresponding to the content of digest version having a longer duration than the former is generated. Further, the condition is not limited to sound volume or two types. For example, conditions may be set in which a threshold is set to a sum of absolute values of differences between adjacent pixels in each image and, by setting two or more conditions, two or more virtual items are set for one real item (or one piece of content). In addition, a condition may be set in which one piece of virtual item information made up of a predetermined range of two or more real items as well as one real time.

Figure 6:
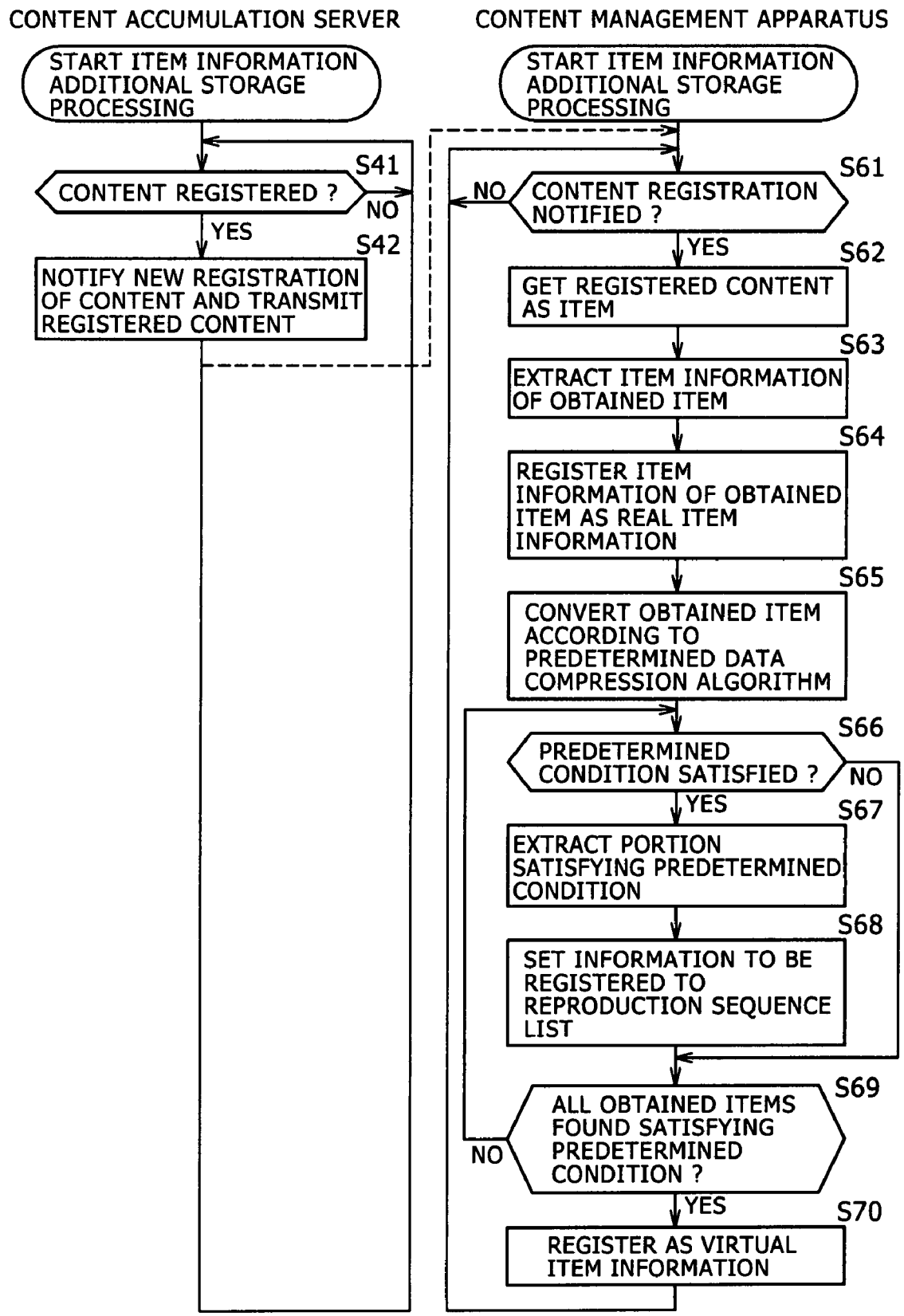
FIG. 6 is a flowchart indicative of item information additional storage processing.

The following describes item information additional storage processing with reference to the flowchart shown in FIG. 6.

In step S41, the storage control block 21a determines whether content has been newly registered in the storage block 25 and repeats this process until a new registration is made. If content is found newly registered in step S41, for example, then the storage control block 21a notifies the content management apparatus 2 thereof in step S42 and transmits the newly registered content to the content management apparatus 2 as an item.

In step S61, the item acquisition block 81 determines whether a notification has come from the content accumulation server 4 of the new registration of content and repeats this process until the notification is received. If the notification as a result of the process of step S42 for example is found received of the new registration of content in step S61, then the item acquisition block 81 gets the supplied item in step S62 and supplies the received item to the real item processing block 82 and the virtual item processing block 84.

In step S63, the real item processing block 82 extracts item information from the item received from the item acquisition block 81.

In step S64, the item information management block 83 attaches ID and URL to the received item information and stores the resultant item information into the item information storage block 55 as real item information 101.

In step S65, the conversion block 91 of the virtual item processing block 84 converts the real item received from the item acquisition block 81 into a reproducible data format in the item portion extraction block 92 in accordance with a compression algorithm for the real item and supplies the converted item to the item portion extraction block 92.

In step S66, the item portion extraction block 92 reproduces the real item converted into a predetermined format received from the conversion block 91 to determine whether the scene satisfies a predetermined condition. If the portion is found satisfying a predetermined condition in step S66, then the item portion extraction block 92 extracts a range satisfying the predetermined condition in that real time in step S67, supplying the extracted range to the reproduction sequence list generating block 93.

In step S68, the reproduction sequence list generating block 93 sets the information to be registered to the reproduction sequence list on the basis of the information of the received range satisfying the predetermined condition and supplies this information to the virtual item information generating block 94.

On the other hand, if no portion satisfying the predetermined condition is found in step S66, then steps S67 and S68 will be skipped.

In step S69, the item portion extraction block 92 determines whether it has been determined whether the range satisfies the predetermined condition in all the reproduction ranges of the supplied real item. If the determination is found not made for all the reproduction ranges, then the procedure returns to step S66. Namely, the processes of steps S66 through S69 are repeated until the real item has been reproduced and the range is found satisfying the predetermined condition in all reproduction ranges.

If the range is found satisfying the predetermined condition in all reproduction ranges of the real item in step S69, then the virtual item information generating block 94 generates virtual item information in step S70 on the basis of the information to be registered in the supplied reproduction sequence list and supplies the generated virtual item information to the item information management block 83. The item information management block 83 stores the virtual item information into the item information storage block 55 as virtual item information 102 on the basis of this item information.

Thus, every time content is newly registered in any of the content accumulation servers 4, the real item information and virtual item information corresponding to the new content are additionally registered in the item information storage block 55.

Figure 7:
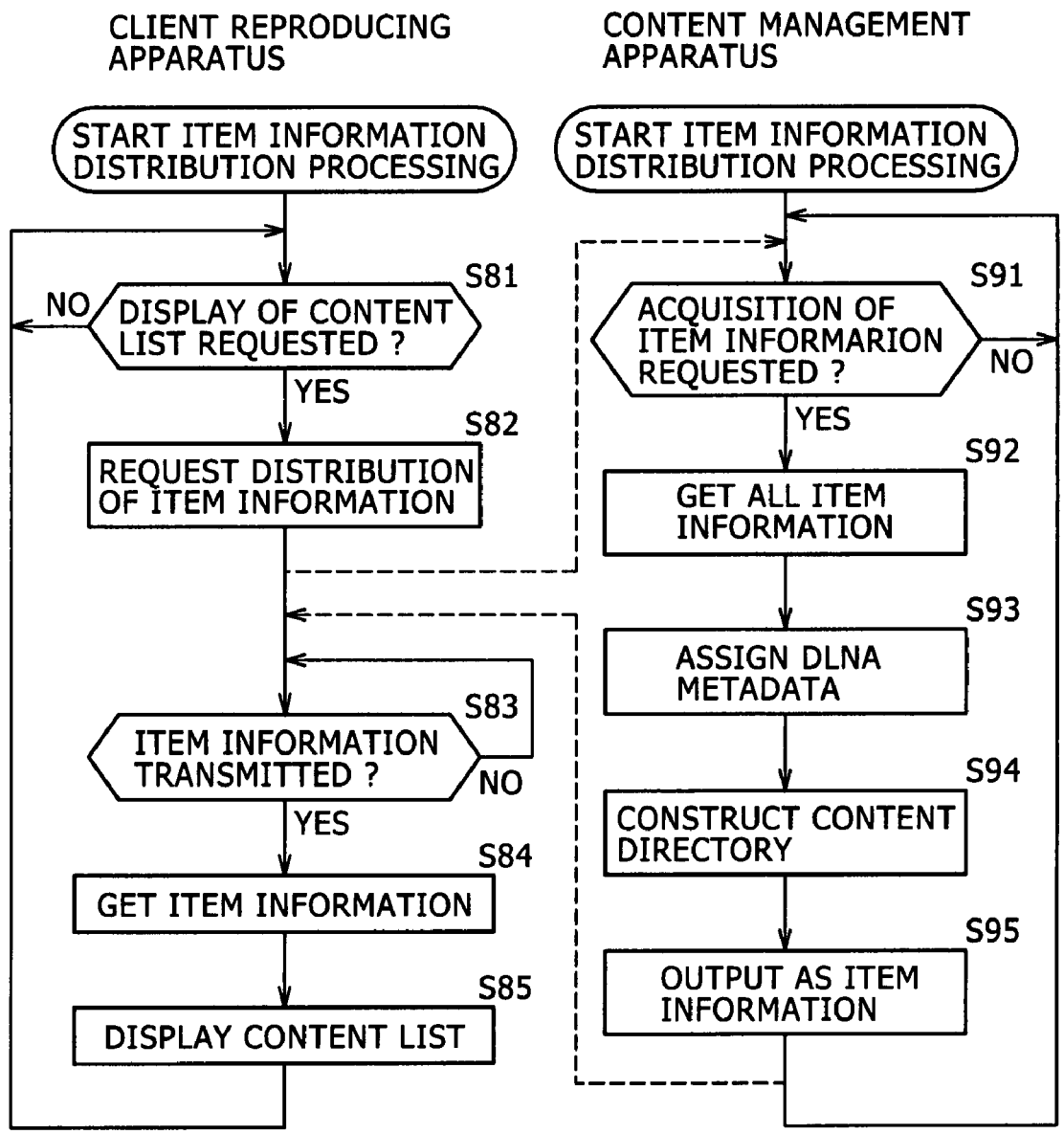
FIG. 7 is a flowchart indicative of item information distribution processing.

The following describes item information distribution processing with reference to the flowchart shown in FIG. 7. In this processing, the content management apparatus 2 distributes the item information accumulated by the above-described processing and the distributed item information is displayed by the client reproducing apparatus 1 as a content list.

In step S81, the list display control block 11a of the client reproducing apparatus 1 determines whether the displaying of the content list has been instructed through the input block 12 and repeats this processing until the displaying of the content is found instructed. If the displaying of the content list is found instructed in step S81, then the list display control block 11a controls the communications block 14 to request the content management apparatus 2 for item information in step S82.

In step S91, the item information acquisition block 85 determines whether item information has been requested from the client reproducing apparatus 1 via the network 3, the HTTP processing block 52, the UPnP processing block 53, and content directory information processing block 71 and repeat this process until the request comes. If item information is found requested as a result of the process of step S82 from the client reproducing apparatus 1 in step S91, then the item information acquisition block 85 accesses the item information storage block 55 to get all the real item information 101 and the virtual item information 102 in step S92.

In step S93, the item information acquisition block 85 assigns DLNA metadata on the basis of the obtained all real item information 101 and virtual item information 102 and supplies the real item information 101 and the virtual item information 102 assigned with the DLNA metadata to the content directory information processing block 71. The DLNA metadata is metadata defined by DLNA.

In step S94, the content directory information processing block 71 constructs a content directory on the basis of the DLNA metadata corresponding to all the real item information 101 and the virtual item information 102 and supplies the constructed content directory information to the UPnP processing block 53.

Figure 8:
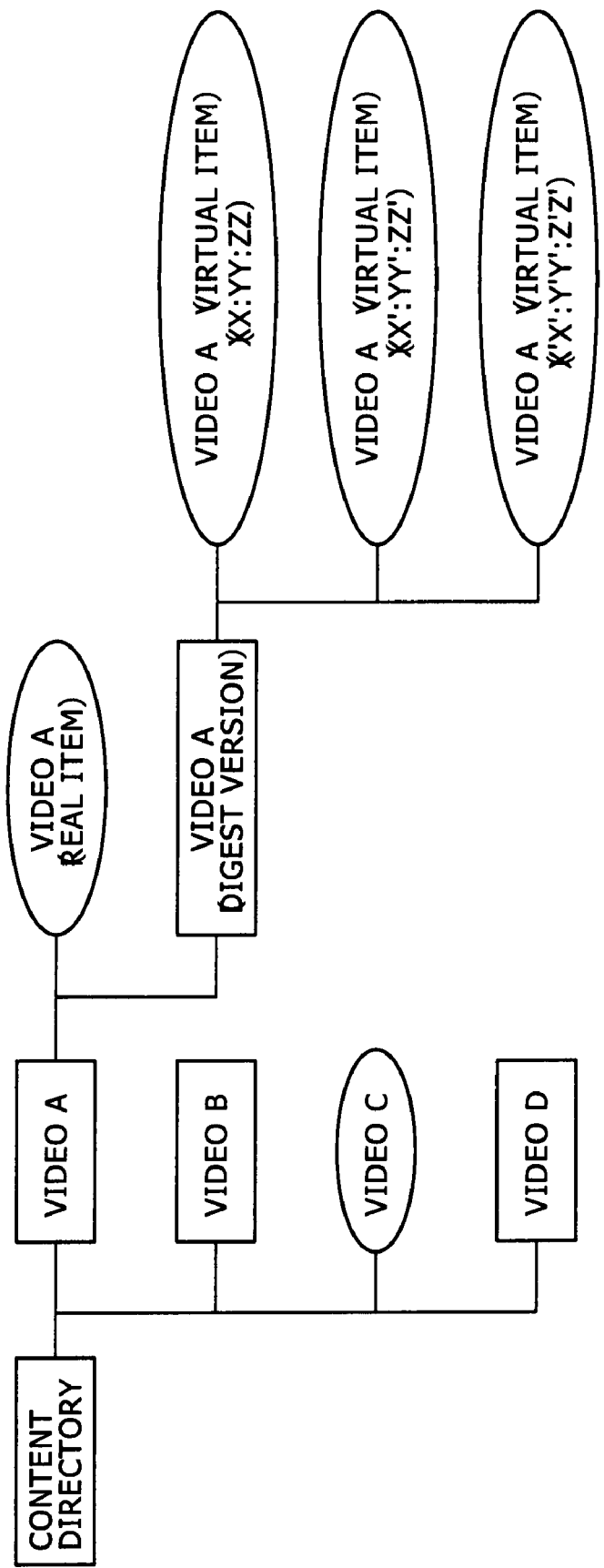
FIG. 8 is a diagram illustrating a structure of a content directory.

The content directory constructed by the content directory information processing block 71 is as shown in FIG. 8, for example, having a tree structure made up of a real item, virtual items, and folders thereof. It should be noted that, in FIG. 8, each oval is indicative of a real item or a virtual item and each rectangle is indicative of a folder of real item or virtual item.

In the example shown in FIG. 8, there are video A through video D on the top layer. Video A, video B, and video D are real item or virtual item folders and video C is a real item. Immediately below folder "video A," there are "video A (real item)" of a real item for use in generating virtual items of video A and folder "video A (digest version)" made up of virtual items of digest version of video A that is realized by reproducing in a predetermined sequence a range satisfying a predetermined condition of video A that is a real item. In addition, immediately below folder "video A (digest version), there are three types of digest versions "video A (virtual item)(XX:YY:ZZ)," "video A (virtual item)(XX':YY':ZZ')," and "video A (virtual item)(X'X':Y'Y':Z'Z')." (XX:YY:ZZ), (XX':YY':ZZ'), (X'X':Y'Y':Z'Z') are indicative of reproduction durations of the content to be realized as virtual items. Thus, the content directory may be said to be a tree structure indicative of a relationship between a real item providing reference and virtual items generated by use of this real item. It should be noted that folder "video B" and folder "video D" have each a tree structure similar to folder "video A," which are not shown for the brevity of drawing.

In step S95, the UPnP processing block 53 converts the received content directory information into a command compliant with the UPnP standard and supplies this command to the HTTP processing block 52. In response, the HTTP processing block 52 converts the content directory information written in the received command into a description format as shown in FIG. 9 as an HTTP protocol format, for example, transmitting the converted content directory information to the client reproducing apparatus 1 as item information.

Referring to FIG. 9, there is shown item information in which the real item information and the virtual item information shown in FIGS. 4 and 5 are written in a format compliant with the HTTP protocol, lines 1 through 14 being indicative of the demanded item information between the lines 1 and 14. Lines 2 through 7 are indicative a descriptive range of the start item information. Likewise, lines 8 through 13 are indicative of a descriptive range of second item information. Line 3 is indicative that the ID of the start item information is "001." Line 4 is indicative that the title of the start item information is "Japan Series First Match." Line 5 is indicative that the reproduction duration of the start item information is one hour. Line 6 is indicative of a URL that is indicative of the location at which the start item information is stored. Line 9 is indicative that the ID of the second item information is "010." Line 10 is indicative that the title of the second item information is "Japan Series First Match Digest." Line 11 is indicative that the reproduction duration of the second item is 10 minutes. Line 12 is indicative of the URL indicative of the location at which the second item is stored.

In step S83, the list display control block 11a of the client reproducing apparatus 1 controls the communications block 14 to determine whether item information has supplied from the content management apparatus 2. If item information as a result of the process of step S94 is found supplied in step S83, then the list display control block 11a controls the communications block 14 to get the supplied item information in step S84.

Figure 10:
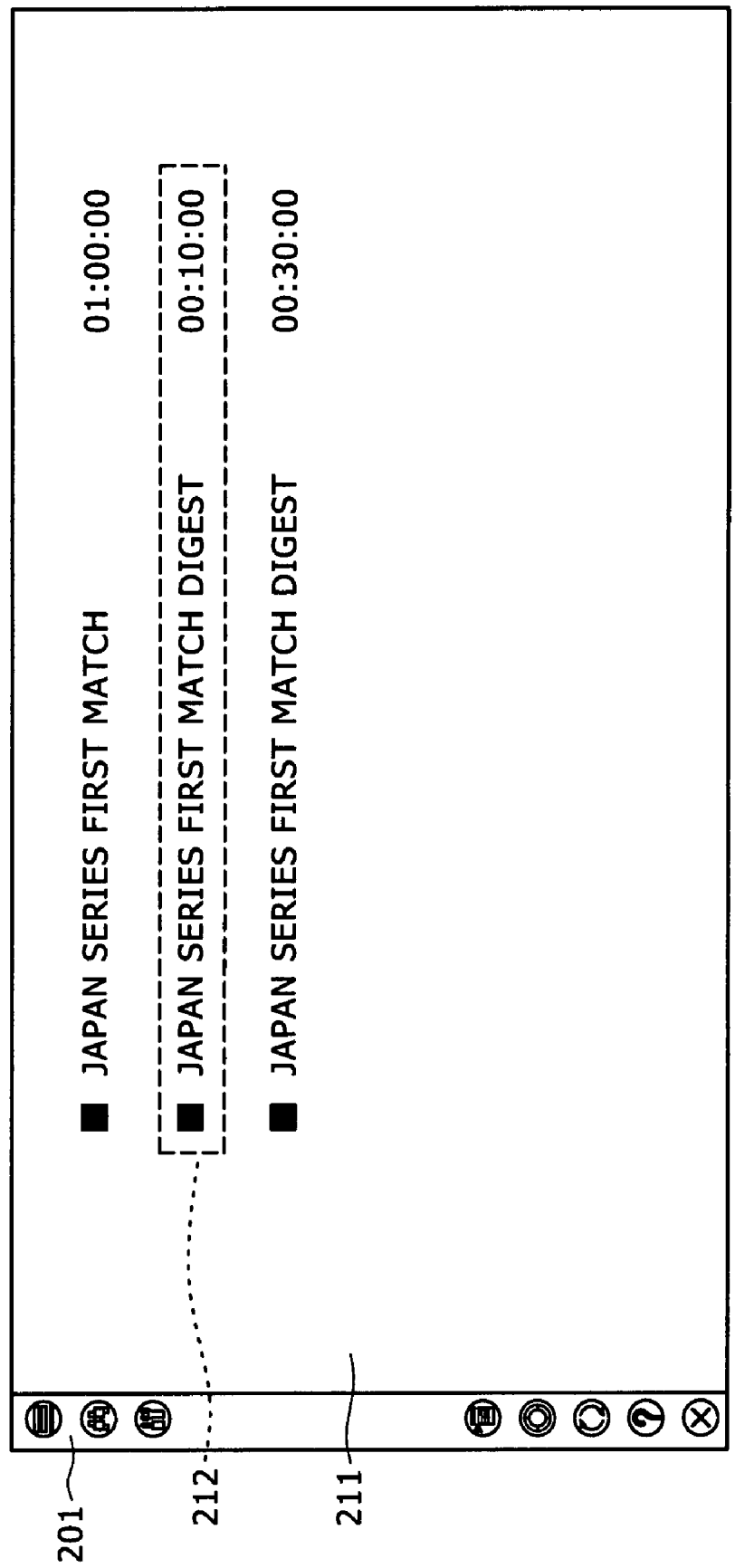
FIG. 10 is a diagram illustrating a display example of a content list.

In step S85, the list display control block 11a recognizes the item information written in a format compliant with HTTP and displays a content list 201 as shown in FIG. 10, for example, on the display block 13.

Referring to FIG. 10, the content list 201 has a content list display box 211, in which the title name and reproduction duration of each piece of content are listed on the basis of the item information. In FIG. 10, "Japan Series First Match" is shown as a title on top followed by reproduction duration "01:00:00," indicating that there is "Japan Series First Match" with reproduction duration of one hour as the start content. On the second row, "Japan Series First Match Digest" is shown as a title followed by reproduction duration "00:10:00," indicating that there is "Japan Series First Match Digest" as the second piece of content having a reproduction duration of 10 minutes. On the bottom row, "Japan Series First Match Digest" is written as a title followed by a reproduction duration "00:30:00," indicating that there is "Japan Series First Match Digest" as the third piece of content having reproduction duration of 30 minutes.

The content list display box 211 has a frame 212 for selection each piece of content. The frame 212 may be moved up and down through the input block 12 to select the piece of content desired for reproduction.

Thus, the above-described sequence of processing displays a list of a real item indicative of all pieces of content stored in the content accumulation servers 4-1 through 4-n connected to the network 3 and the virtual items generated on the basis of the real item. Also, as shown in FIG. 9, a real item and virtual items may be written as one piece of content each. Therefore, in the content list 201, a piece of content made up of real item information and a piece of content made up of virtual item information may also be recognizes in the same manner. Consequently, the user can recognize each piece of content as an individual piece of content without being aware of the difference between real item and a virtual item.

Figure 11:
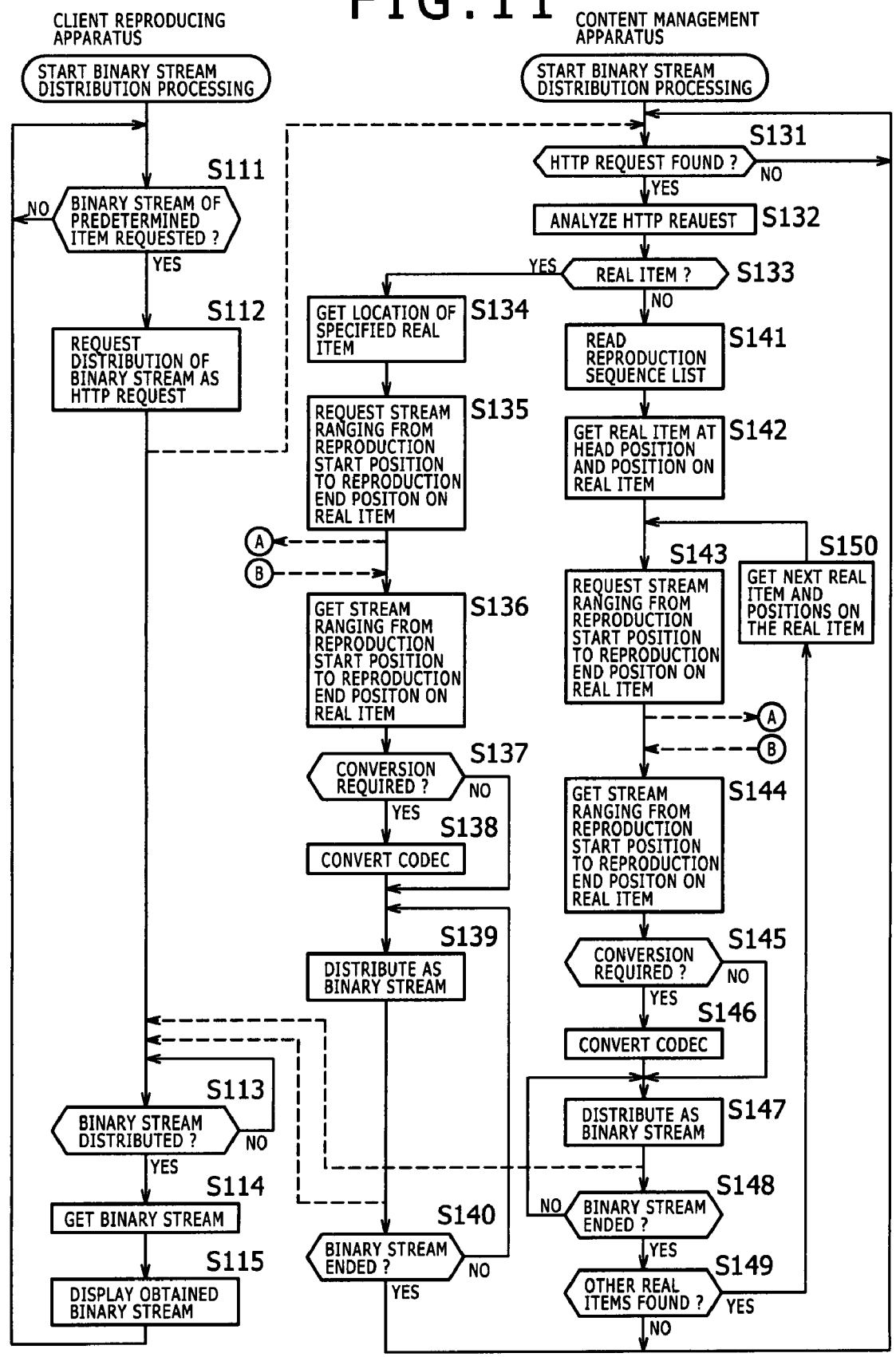
FIG. 11 is a flowchart indicative of binary stream distribution processing.
Figure 12:
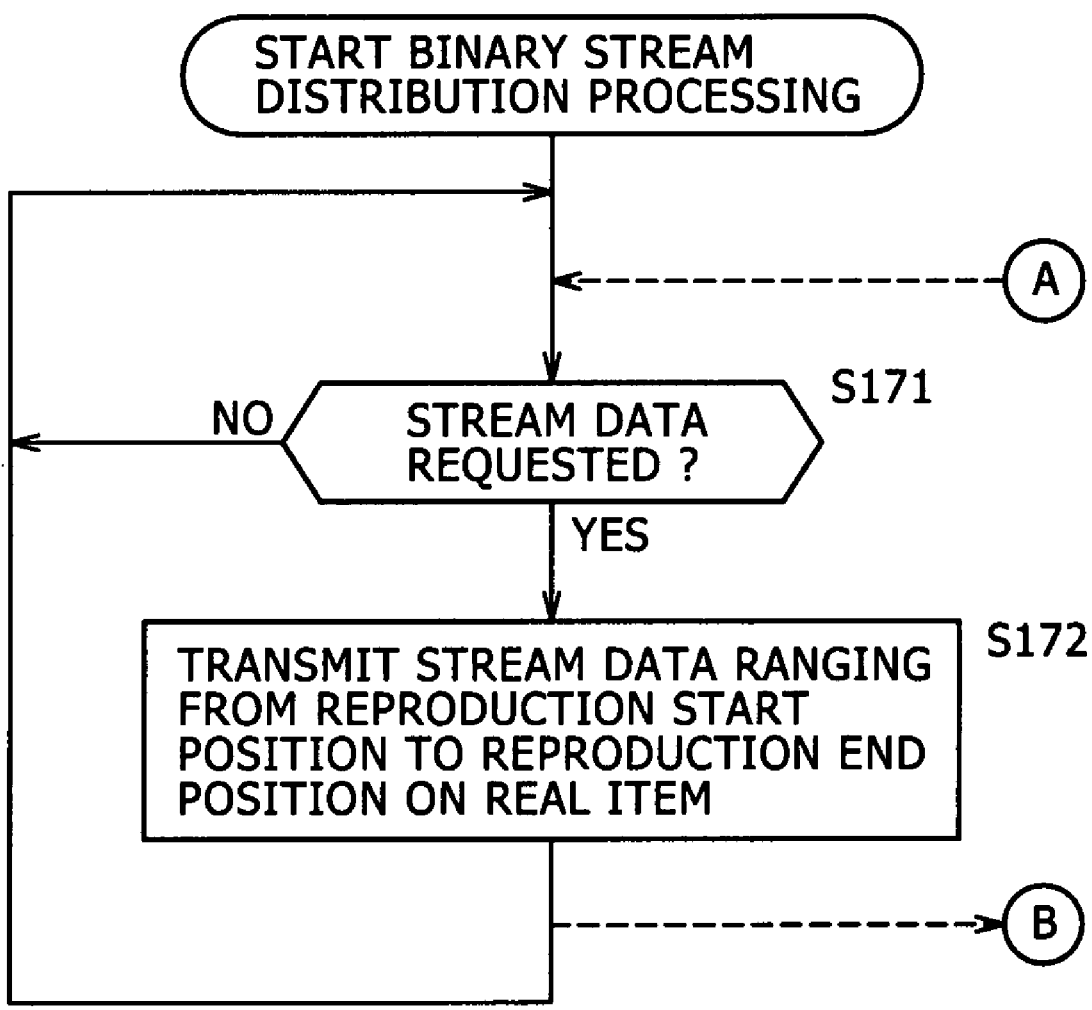
FIG. 12 is a flowchart continued from the flowchart shown in FIG. 11.

The following describes binary stream distribution processing in which the client reproducing apparatus 1 receives a binary stream of content from the content management apparatus 2, with reference to the flowcharts shown in FIGS. 11 and 12.

In step S111, the content reproduction control block 11b of the control block 11 of the client reproducing apparatus 1 determines whether content has been specified through the input block 12 to request the distribution of a binary stream of a corresponding item and repeats this process until the distribution is requested. If the frame 212 is operated through the input block 12 to specify the reproduction in the content list 201 shown in FIG. 10 in step S111, it indicates that the distribution of a binary stream of the corresponding item has been requested, upon which the procedure goes to step S112. Namely, in the case of FIG. 10, for example, the reproduction of "Japan Series First Match Digest" having reproduction duration of 10 minutes has been specified.

In step S112, the content reproduction control block 11b generates an HTTP request for requesting the distribution of a binary stream of the item corresponding to the content made up of an HTTP command, such as a get command, and specified through the frame 212, on the basis of the item information of the item corresponding to the content request for binary stream distribution and controls the communications block 14 to transmit the generated HTTP request to the content management apparatus 2. To be more specific, the item of the content specified for reproduction is identified by the ID for identifying that item. The use of this ID, the distribution of a binary stream is requested by HTTP request.

In step S131, the content reproduction request acquisition block 121 determines whether the HTTP request for requesting a binary stream of the item corresponding to the specified content has been transmitted to the communications block 51 via the HTTP processing block 52 and repeats this process until the HTTP request comes. If the HTTP request as a result of the process of step S112 for example is found received in step S131, then the content reproduction request acquisition block 121 supplies the received HTTP request to the item identification block 122, upon which the procedure goes to step S132.

In step S132, the item identification block 122 analyzes the received HTTP request to determine whether the item corresponding to the content requested for binary stream distribution is a real item or a virtual item. To be more specific, on the basis of the ID of the item corresponding to the content requested for reproduction by the HTTP request, the item identification block 122 searches the item information storage block 55 for the real item information 101 and the virtual item information 102 to determine whether the retrieved item information is a real item or a virtual item.

In step S133, the item identification block 122 determines the item corresponding to the content requested for binary stream distribution is a real item. If the item corresponding to the content requested for binary stream distribution is found to be a real item in step S133, then the procedure goes to step S134.

In step S134, the item identification block 122 supplies the ID of the real item corresponding to the content requested for binary stream distribution to the real item information acquisition block 125. The real item information acquisition block 125 accesses and searches the item information storage block 55 for the real item information 101 corresponding to the supplied ID to retrieve the real item information of the real item corresponding to the content requested for binary stream distribution and, on the basis of the retrieved real item information, supplies the file name of the real item specified for reproduction and the information of reproduction position on the real item to the real item collection block 126.

In step S135, on the basis of the information of the file name of the real item requested for binary stream distribution, the real item collection block 126 requests, via the HTTP processing block 52, the communications block 51, and the network 3, the content accumulation server 4 in which the real item specified for binary stream distribution is stored for the stream data ranging from the reproduction start position to the reproduction end position of the real item specified by binary stream distribution. For example, in the case of the real item information 101 indicated by "ID=001" shown in FIG. 4, the stream data ranging from the reproduction start position to the reproduction end position of file "Filename=/content/a.mpg" is requested.

In step S171 (FIG. 12), distribution control block 21*b* of the control block 21 of the content accumulation server 4 controls the communications block 24 to determine whether the distribution of stream data has been requested from the content management apparatus 2 via the network 3 and repeats this process until the request comes. If the request for the distribution of stream data as a result of the process of step S135 for example is found received in step S171, then the procedure goes to step S172.

In step S172, the distribution control block 21*b* reads the requested real item file from the storage block 25 and controls the communications block 24 to transmit the stream data ranging from the specified reproduction start position to reproduction end position to the content management apparatus 2.

In step S136 (FIG. 11), the real item collection block 126 gets the stream data supplied from the content accumulation server 4 in step S172 and supplies the received stream data to the conversion block 127.

In step S137, on the basis of the data format of the supplied stream data, the conversion block 127 determines whether codec conversion is necessary or not. If the codec conversion is found necessary, the procedure goes to step S138, in which the stream data is converted into a predetermined data format, the resultant stream data being supplied to the item binary stream generating block 128.

On the other hand, if the codec conversion is found unnecessary in step S137, then the process of step S138 is skipped and therefore the stream data is directly supplied to the item binary stream generating block 128.

In step S139, the item binary stream generating block 128 generates a binary stream from the supplied stream data and supplies the generated binary stream to the item binary stream output block 129. The item binary stream output block 129 distributes the received binary stream to the client reproducing apparatus 1 via the HTTP processing block 52, the communications block 51, and the network 3.

In step S140, the item binary stream output block 129 determines whether there still remains the binary stream to be distributed. If any binary streams are found, the procedure returns to step S139 to repeat the process of step S140 until there is no more binary stream.

If no more binary stream is found in step S140, then it is regarded that the distribution has come to an end, upon which the procedure returns to S131.

In step S113, the content reproduction control block 11*b* of the client reproducing apparatus 1 controls the communications block 14 to determine whether the binary stream of the item corresponding to the content requested for distribution by the HTTP request has been distributed from the content management apparatus 2 via the network 3 and repeats this process until the binary stream is distributed. If the binary stream is found distributed as a result of the process of step S139 for example in step S113, then the content reproduction control block 11*b* sequentially gets the binary stream in step S114 and displays the obtained binary stream on the display block 13 in step S115.

Thus, if the content specified by the client reproducing apparatus 1 is a real item, the specified content can be distributed from the content accumulation server 4 in which the content corresponding to the specified real item is stored, via the content management apparatus 2.

On the other hand, if the item requested for binary stream distribution is not a real item, namely, is a virtual item in step S133, the item identification block 122 supplies the virtual item information 102 of the virtual item corresponding to the content requested for binary stream distribution to the virtual item information acquisition block 123 in step S141.

In step S142, the virtual item information acquisition block 123 searches the item information storage block 55 for the virtual item information 102 corresponding to the ID to get the virtual item information of the virtual item corresponding to the content requested for binary stream distribution and, on the basis of the obtained virtual item information, gets the real item at the start position and the information about the reproduction start position of that real item in the reproduction sequence list 102a of the virtual item specified for binary stream distribution, thereby supplying the obtained real item and the information to the real item acquisition instruction block 124.

Namely, in the case of virtual item information 102 indicated by "ID=010" shown in FIG. 5, for example, the real item at the start position is in a reproduction range of 10 to 20 seconds of the real items corresponding to the file name specified in "/content/a.mpg" indicated in reproduction sequence 1 in the reproduction sequence list 102a. Therefore, for the reproduction start position, a timing of 10 to 20 seconds is specified.

In step S143, the real item acquisition instruction block 124 supplies the file name corresponding to the supplied real item and the information about the reproduction start position and the reproduction end position on that real item to the real item collection block 126.

It should be noted that the processes of steps S143 through S148 are substantially the same as those of steps S135 through S140 described above, so that the description thereof will be skipped.

In step S148, the virtual item information acquisition block 123 references the reproduction sequence list 102a to determine whether there is a next real item. Namely, in the example shown in FIG. 5, after reproducing a reproduction range of 10 to 20 seconds of the real item corresponding to the file name specified in "/content/a.mpg" indicated in reproduction sequence 1 as the real item at the start position, a next real item is found existing because there is a reproduction range of 30 to 40 seconds in the real item corresponding to the file name specified in "/content/a.mpg" indicated in reproduction sequence 2, upon which the procedure goes to step S150.

In step S150, on the basis of the obtained virtual item information, the virtual item information acquisition block 123 gets a real item next to the real item just completed in reproduction and the real item information of this next real item from the reproduction sequence list 102a of virtual items specified for reproduction and supplies the obtained next real item and real item information thereof to the real item acquisition instruction block 124, upon which the procedure returns to step S143.

Namely, as described above, after reproducing the above-mentioned reproduction range of 10 to 20 seconds in the real item corresponding to the file specified in "/content/a.mpg," indicated in reproduction sequence 1 the above-mentioned reproduction range of 30 to 40 seconds in the real item corresponding to the file name specified in "/content/a.mpg" indicated in reproduction sequence 2 is outputted as a binary stream.

Then, when the binary streams of all real items registered in the reproduction sequence list 102a have been transmitted, the procedure returns to step S131 to repeat the above-mentioned processing therefrom. Therefore, in the case of the reproduction sequence list shown in FIG. 5, when the processes of steps S143 through S150 are repeated three times for the reproduction range of 10 to 20 seconds in the real item corresponding to the file name specified in "/content/a.mpg," the reproduction range of 30 to 40 seconds in the real item corresponding to the file name specified in "/content/a.mpg," and the reproduction range of 50 to 60 seconds in the real item corresponding to the file name specified in "/content/a.mpg" of reproduction sequences 1 through 3, all the real items are processed. Consequently, no more real items are found existing in step S149.

Therefore, if the item information corresponding to the content specified for reproduction is the virtual item information 102 shown in FIG. 5, of the real items of the original content whose title name is "Japan Series First Match," the real items of reproduction sequences 1 through 3 extracted as a reproduction range greater in volume than a predetermined level are sequentially reproduced according to the reproduction sequence of the reproduction sequence list 102a to reproduce the title name as a piece of content indicated by "Japan Series First Match Digest."

To be more specific, the above-described processing is realized by managing content not on an item basis but on item information basis. In the past, each piece of content displayed in a content list is written by use of a URL indicative of the location of a file of real items, the entity of content, so that the reproduction of a predetermined range in two or more pieces of content in a predetermined reproduction sequence has to access the number of locations of real items equal to the number of pieces of content to repeat reproduction and stop processing, thereby hindering the continuous reproduction of two or more pieces of content.

However, in the processing according to an embodiment of the present invention, content is managed not on an item basis but on item information basis as described above, so that, for real item content and virtual item content, the location of item information is managed by URL. Thus, regardless of the difference between real item content and virtual item content, the entity of content is managed by item information, so that each virtual item can be handled as one piece of content on the content list.

Also, with commands configured to manage the location of each file (or real item) providing the entity of content such as DLNA, the location of item information is written by URL instead of the URL indicative of a file providing the entity of content, thereby enabling the representation of each virtual item as if it were the location of a real item.

Further, if the content requested for the distribution of binary stream by the client reproducing apparatus 1 is a virtual item, the content management apparatus 2, on the basis of the reproduction sequence list 102a included in the corresponding virtual item information 102, can collect a predetermined range of real items as two or more entities making up a specified virtual item from the content accumulation server 4, thereby continuously distributing the content in a reproduction sequence specified in the reproduction sequence list. Thus, this configuration allows the distribution of the content made up of virtual items as if the content were a real item.

In the above-described examples, the reproduction range of real items is individually extracted for one piece of original content under a predetermined condition and the extracted real items are reproduced in a predetermined sequence, thereby distributing the content providing virtual items as a binary stream. However, it is also practicable, for a real item making up virtual items, to continuously reproduce not only two or more portions of the same real item but also some of two or more different real items, in a predetermined sequence. Further, it is also practicable to continuously reproduce some of real items stored in different content accumulation servers 4 interconnected on a network, in a predetermined sequence.

As described above, in one embodiment of the present invention, one command for reproduction can continuously reproduce, in a predetermined sequence, a range of part of content stored in a plurality of servers on a network.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 13:
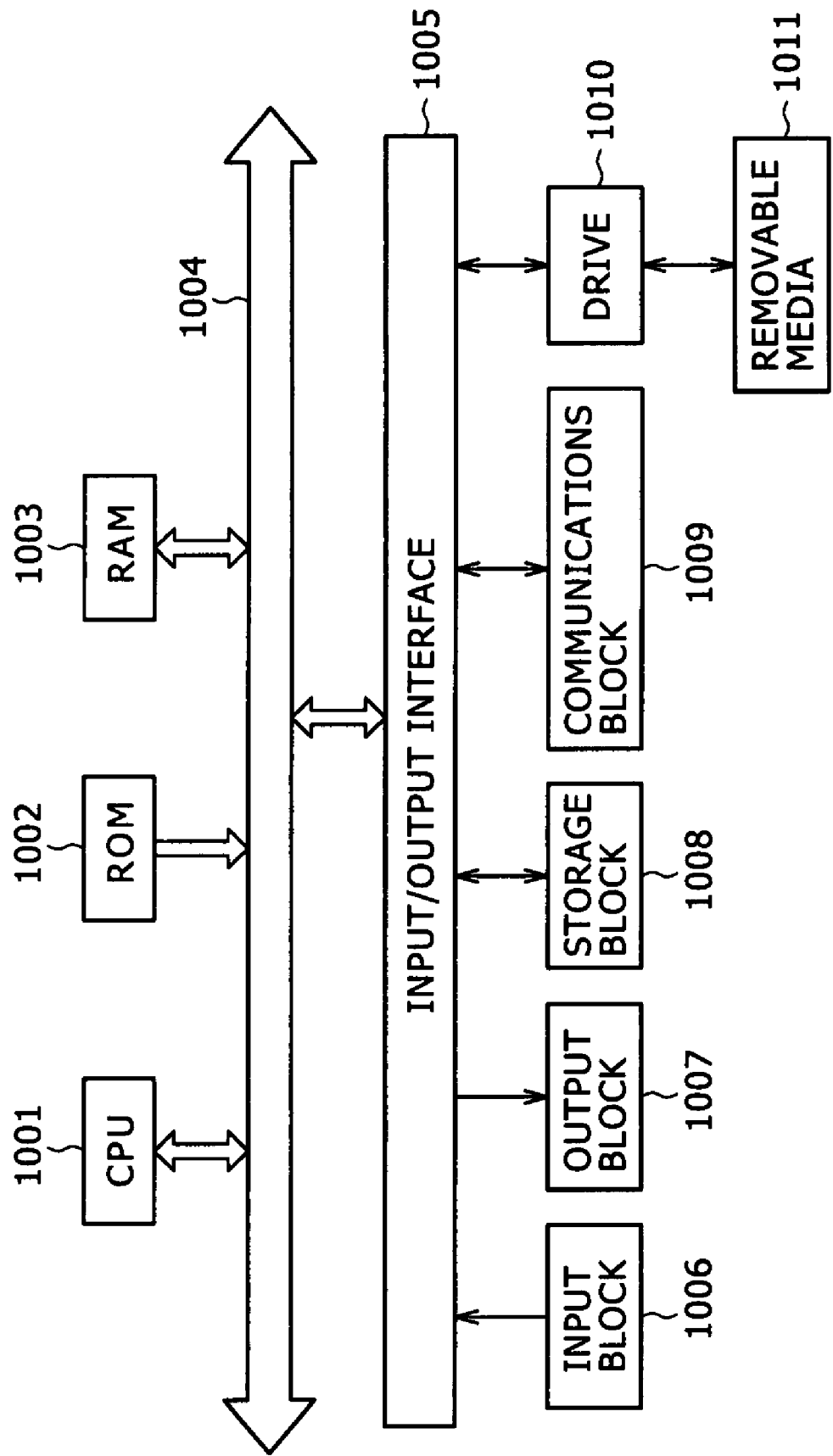
FIG. 13 is a block diagram illustrating an exemplary configuration of a personal computer.

Referring to FIG. 13, there is shown a block diagram of a general-purpose personal computer. This personal computer has a CPU 1001. The CPU 1001 is connected to an input/output interface 1005 via a bus 1004. The bus 1004 is connected to a ROM 1002 and a RAM 1003.

The input/output interface 1005 is connected with an input block 1006 based on input devices such as a keyboard and a mouse through which the user enters commands, an output block 1007 configured to output images such as processing operating images and processing result images onto a display device, a storage block 1008 based on a hard disk drive for example configured to store programs and various kinds of data and a communications block 1009 based on a LAN adaptor for example to execute communications processing via a network typified by the Internet. The input/output interface is also connected with a drive 1010 through which data is written or read to or from a removable media 1011 including magnetic disk (including flexible disk, optical disk (including CD-ROM (Compact Disc-Read Only Memory) and DVD (Digital Versatile Disc)), magneto-optical disk (including MD (Mini Disc)), and semiconductor memory, for example.

The CPU 1001 executes various kinds of processing as instructed by a program stored in the ROM 1002 or a program stored from the removable media 1011 into the storage block 1008 and loaded therefrom into the RAM 1003. The RAM 1003 also appropriately stores those data which are necessary for the CPU 1001 to execute various kinds of processing.

It should be noted herein that the steps for describing each program recorded in recording media include the processing operations which are executed concurrently or discretely as well as the processing operations which are sequentially executed in a time-dependent manner.

It should be understood by those skilled in the art that various modifications, combinations, sub-combinations and alterations may occur depending on design requirements and other factor in so far as they are within the scope of the appended claims or the equivalents thereof.

The invention claimed is:

1. An information processing apparatus configured to distribute stored content to a client reproducing apparatus connected to said information processing apparatus via a network, comprising:
   acquiring means for acquiring said stored content as a real item;
   real item information generating means for generating real item information including information about a location at which said real item acquired by said acquiring means is stored and an own location;
   extracting means for extracting a range that satisfies a predetermined condition from said real item acquired by said acquiring means;
   virtual item generating means for generating, of said real item extracted by said extracting means, content made up of a plurality of ranges satisfying a predetermined condition as a virtual item;
   reproduction sequence list generating means for generating a reproduction sequence list indicative of a location of a plurality of real items including a range satisfying said predetermined condition making up said virtual item, a reproduction range indicative of a range satisfying said predetermined condition in each of said plurality of said real items, and a reproduction sequence of a reproduction range in each of said plurality of said real items;
   virtual item information generating means for generating virtual item information including said reproduction sequence list and information of an own location;
   collecting means for collecting said real item on the basis of said generated virtual item information; and
   distributing means for sequentially distributing a reproduction range of said plurality of real items making up said virtual item on the basis of said reproduction sequence list.

2. The information processing apparatus according to claim 1, wherein said stored content is stored in each of a plurality of content accumulation servers connected to said information processing apparatus via said network.

3. The information processing apparatus according to claim 1, wherein own locations included in said real item information and said virtual item information are written in a same format.

4. The information processing apparatus according to claim 1, wherein own locations included in said real item information and said virtual item information are written as uniform resource locators.

5. The information processing apparatus according to claim 1, further comprising:
   inputting means through which content to be reproduced is specified;
   wherein, if content specified through said inputting means for reproduction is a real item, said collecting means collects real item information corresponding to said content specified for reproduction and, if said content specified for reproduction is a virtual item, said collecting means collects said real item on the basis of said generated virtual item information, and
   if said content specified for reproduction is a real item, said distributing means distributes said collected real item and, if said content specified for reproduction is a virtual item, said distributing means sequentially distributes in said predetermined sequence a reproduction range of a plurality of said real items making up said virtual item on the basis of said reproduction sequence list.

6. The information processing apparatus according to claim 5, further comprising:
   content list generating means for generating a list of said real item information and said virtual item information as a content list of said content,
   wherein, of said real information and said virtual item information corresponding to said content specified for reproduction in said content list by said client reproducing apparatus, on the basis of information of said own location, said distributing means accesses said real item information and said virtual item information corresponding to said content specified for reproduction and, if said content specified for reproduction is a real item, distributes said real item of said content specified for reproduction and, if said content specified for reproduction is a virtual item, sequentially distributes a reproduction range of a plurality of said real items making up said virtual item in said reproduction sequence in accordance with said reproduction sequence list.

7. The information processing apparatus according to claim 1, wherein said network is based on a digital living network alliance standard.

8. An information processing method configured to operate on an information processing apparatus configured to distribute stored content to a client reproducing apparatus connected to said information processing apparatus via a network, comprising:
   acquiring said stored content as a real item;
   generating real item information including information about a location at which said real item acquired in the acquiring step is stored and an own location;

extracting a range that satisfies a predetermined condition from said real item acquired in the acquiring step;

generating, of said real item extracted in the extracting step, content made up of a plurality of ranges satisfying a predetermined condition as a virtual item;

generating a reproduction sequence list indicative of a location of a plurality of real items including a range satisfying said predetermined condition making up said virtual item, a reproduction range indicative of a range satisfying said predetermined condition in each of said plurality of said real items, and a reproduction sequence of a reproduction range in each of said plurality of said real items;

generating virtual item information including said reproduction sequence list and information of an own location;

collecting said real item on the basis of said generated virtual item information; and sequentially distributing a reproduction range of said plurality of real items making up said virtual item on the basis of said reproduction sequence list.

9. A program configured to make a computer for controlling an information processing apparatus configured to distribute stored content to a client reproducing apparatus connected to said information processing apparatus via a network execute the steps of:

acquiring said stored content as a real item;

generating real item information including information about a location at which said real item acquired in the acquiring step is stored and an own location;

extracting a range that satisfies a predetermined condition from said real item acquired in the acquiring step;

generating, of said real item extracted in the extracting step, content made up of a plurality of ranges satisfying a predetermined condition as a virtual item;

generating a reproduction sequence list indicative of a location of a plurality of real items including a range satisfying said predetermined condition making up said virtual item, a reproduction range indicative of a range satisfying said predetermined condition in each of said plurality of said real items, and a reproduction sequence of a reproduction range in each of said plurality of said real items;

generating virtual item information including said reproduction sequence list and information of an own location;

collecting said real item on the basis of said generated virtual item information; and sequentially distributing a reproduction range of said plurality of real items making up said virtual item on the basis of said reproduction sequence list.

10. A program storage media configured to store a program configured to make a computer for controlling an information processing apparatus configured to distribute stored content to a client reproducing apparatus connected to said information processing apparatus via a network execute the steps of:

acquiring said stored content as a real item;

generating real item information including information about a location at which said real item acquired in the acquiring step is stored and an own location;

extracting a range that satisfies a predetermined condition from said real item acquired in the acquiring step;

generating, of said real item extracted in the extracting step, content made up of a plurality of ranges satisfying a predetermined condition as a virtual item;

generating a reproduction sequence list indicative of a location of a plurality of real items including a range satisfying said predetermined condition making up said virtual item, a reproduction range indicative of a range satisfying said predetermined condition in each of said plurality of said real items, and a reproduction sequence of a reproduction range in each of said plurality of said real items;

generating virtual item information including said reproduction sequence list and information of an own location;

collecting said real item on the basis of said generated virtual item information; and sequentially distributing a reproduction range of said plurality of real items making up said virtual item on the basis of said reproduction sequence list.

11. An information processing apparatus configured to distribute stored content to a client reproducing apparatus connected to said information processing apparatus via a network, comprising:

an acquirer configured to acquire said stored content as a real item;

a real item information generator configured to generate real item information including information about a location at which said real item acquired by said acquirer is stored and an own location;

an extractor configured to extract a range that satisfies a predetermined condition from said real item acquired by said acquirer;

a virtual item generator configured to generate, of said real item extracted by said extractor, content made up of a plurality of ranges satisfying a predetermined condition as a virtual item;

a reproduction sequence list generator configured to generate a reproduction sequence list indicative of a location of a plurality of real items including a range satisfying said predetermined condition making up said virtual item, a reproduction range indicative of a range satisfying said predetermined condition in each of said plurality of said real items, and a reproduction sequence of a reproduction range in each of said plurality of said real items;

a virtual item information generator configured to generate virtual item information including said reproduction sequence list and information of an own location;

a collector configured to collect said real item on the basis of said generated virtual item information; and a distributor configured to sequentially distribute a reproduction range of said plurality of real items making up said virtual item on the basis of said reproduction sequence list.

* * * * *